United States Patent [19]
Alexandrescu et al.

[11] 4,447,827
[45] May 8, 1984

[54] X-RAY DIAGNOSTIC INSTALLATION

[75] Inventors: Mircea Alexandrescu, Braeuningshof; Joerg Haendle, Erlangen, both of Fed. Rep. of Germany

[73] Assignee: Siemens Aktiengesellschaft, Berlin & Munich, Fed. Rep. of Germany

[21] Appl. No.: 378,785

[22] Filed: May 17, 1982

[30] Foreign Application Priority Data

Jun. 23, 1981 [DE] Fed. Rep. of Germany ....... 3124584

[51] Int. Cl.³ .............................................. H04N 7/18
[52] U.S. Cl. .................................... 358/111; 364/414; 378/99
[58] Field of Search .......................... 358/111; 378/99; 364/414

[56] References Cited

U.S. PATENT DOCUMENTS 4,367,490 1/1983 Riederer ................................ 378/99
4,398,213 8/1983 Haendle .............................. 358/111

FOREIGN PATENT DOCUMENTS 3018129 10/1981 Fed. Rep. of Germany .

Primary Examiner—Howard W. Britton
Attorney, Agent, or Firm—Hill, Van Santen, Steadman & Simpson

[57] ABSTRACT

An exemplary embodiment has the purpose of representation of margins of organs, and comprises a television pickup system, a first image memory, a difference stage for providing subtraction images through difference formation from the stored and the current video signal, and a monitor. Connected with the output of the difference stage is an adder which is connected with a second image memory whose output signal is supplied to the adder so that, in the second image memory, the image point data of the difference stage is summed up. The output signal of the second image memory is supplied to the monitor. The circuit disposed between the first image memory and the adder is so designed that it forms the absolute values ($|A|$) of the image point data from the difference stage.

3 Claims, 9 Drawing Figures

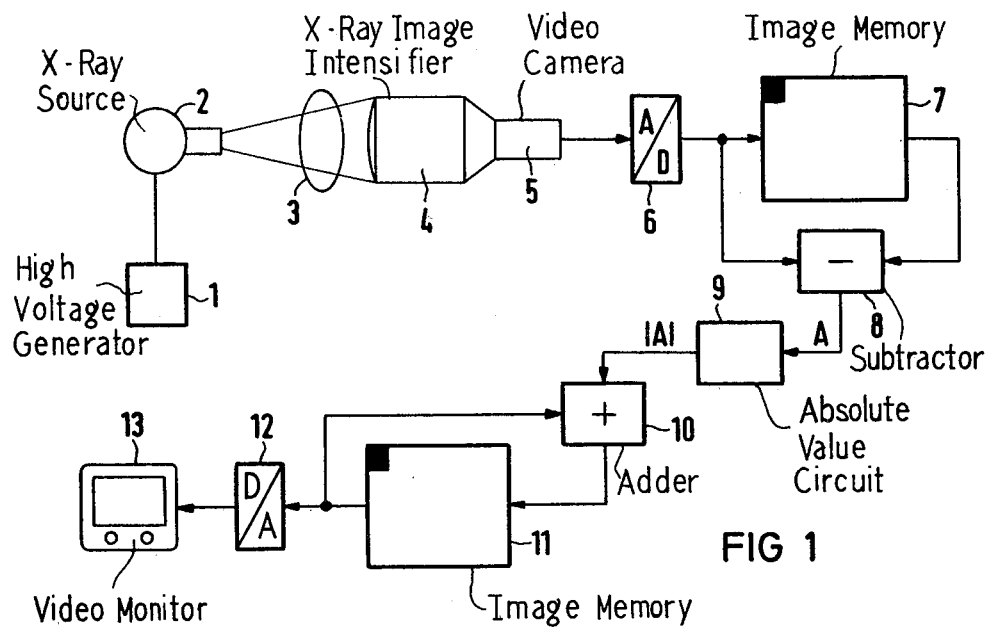
FIG 1
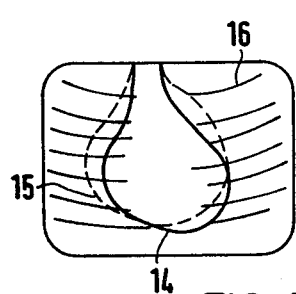
FIG 2
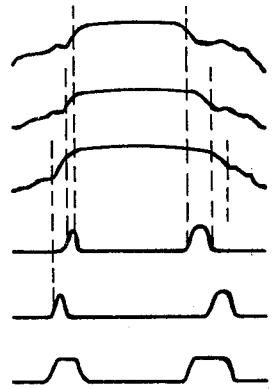
FIG 3
FIG 4
FIG 5
FIG 6
FIG 7
FIG 8
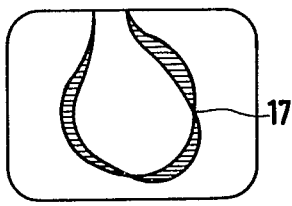
FIG 9

4,447,827

X-RAY DIAGNOSTIC INSTALLATION

BACKGROUND OF THE INVENTION

The invention relates to an X-ray diagnostic installation, comprising a television pickup system, comprising a first image memory, comprising a difference stage for providing subtraction images through difference formation from the stored and the current video signals, and comprising a monitor, wherein an adder is connected with the output of the difference stage, which adder is connected with a second image memory whose output signal is supplied to the adder so that, in the second image memory, the image point data of the difference stage are summed up, and wherein the output signal of the second image memory is supplied to the monitor. Diagnostic installations of this type are employed for the purpose of subtraction of X-ray images in real time.

In the case of the X-ray diagnostic installation of the type initially cited according to German application P 30 18 129.4 (U.S. Pat. No. 4,398,213 issued Aug. 9, 1983), a subtraction between the video signal of a stored image, representing a mask, and the video signal of an immediate image is conducted. The stored video signal corresponds, in particular, to a blank image (without contrast medium), whereas the current or immediate video signals represent filling images with contrast medium. For the representation of the entire contrast medium flow the difference signals are superimposed in the second image memory so that after completion of the examination the entire filling image is shown on the monitor.

SUMMARY OF THE INVENTION

The invention proceeds from the object of producing an X-ray diagnostic installation of the type initially cited which additionally renders possible a representation of margins of moved organs, for example, the heart, also without contrast medium.

The object is achieved in accordance with the invention in that a circuit disposed between the first image memory and the adder is so designed that it forms the absolute values of the image point data from the difference stage. Through the absolute value formation the differences of successive images are summed up in the second image memory. They are thereby superimposed in one image and displayed on the monitor.

The invention shall be explained in greater detail in the following on the basis of an exemplary embodiment illustrated in the Figures on the accompanying drawing sheet; and other objects, features and advantages will be apparent from this detailed disclosure and from the appended claims.

BRIEF DESCRIPTION OF THE DRAWING

FIG. 1 shows an X-ray diagnostic installation according to the invention;

FIG. 2 shows an X-ray image, to be processed by the X-ray diagnostic installation of FIG. 1, for the purpose of explaining the invention;

FIGS. 3 through 8 show curve progressions of video signals corresponding to FIG. 2; and FIG. 9 shows an X-ray processed by the X-ray diagnostic installation of FIG. 1.

DETAILED DESCRIPTION

In FIG. 1, a high voltage generator 1 is illustrated which supplies an X-ray tube 2 in the ray path of which a patient 3 is disposed. An X-ray image intensifier 4, receiving the transmitted X-ray image is connected with a video camera 5 whose output signal is supplied to an analog-to-digital converter (A/D converter) 6. The digitized video signal is read into a first image memory 7. The output of the image memory 7 is connected with the difference stage 8 to which also the immediate (or current) video signal from the A/D converter 6 is supplied. The difference stage 8 forms the difference (pixel by pixel) between the stored image point data of the digitized video signal stored in the image memory 7, and the immediate (or current) image point data of the newly generated digitized video signal. The output A of the difference stage 8 is connected with a circuit 9 which forms the absolute values of the image point data from the difference stage 8. The absolute value signal |A| from the circuit 9 is supplied to an adder 10 whose output is connected with a second image memory 11. The output of the image memory 11 is fed back to a second input of the adder 10. In addition, the image memory 11 is connected with a digital-to-analog converter (D/A converter) 12. The analog video signal is displayed on a monitor 13.

In the first image memory 7 an image can be stored as a mask from which all following images are subtracted. The storage of the image can, for example, be controlled by the R-curve of an EKG. However, the video signals can be continuously read into the first image memory so that respectively successive images are subtracted.

On the basis of the following Figures, the method of operation of the circuit for a continuous subtraction shall be explained in greater detail. In FIG. 2, an X-ray image is illustrated in which the contour of a heart 14 of the patient 3 is imaged. The border of the heart moves between the fully illustrated contour 14 and the contour 15 illustrated in broken lines. Superimposed on this image are ribs 16 of the patient 3 so that the contour of the heart is recognizable only with difficulty. Moreover, the contour is blurred through the movement.

In FIGS. 3 through 5, video signals of successive X-ray images are illustrated. They exhibit deviations from one another which are caused by the movement of the heart.

The first curve progression, which is illustrated in FIG. 3, is first read into the image memory 7. The next scanning of the X-ray image by the video camera 5 supplies a video signal which is illustrated in FIG. 4. The stored curve progression of FIG. 3 and the waveform of FIG. 4, characterizing the immediate (or current) X-ray image, are connected in digitized fashion to be inputs of the difference stage 8 which ascertains the difference between the signals. Following the absolute value formation in the circuit 9, one obtains digital difference signals (represented in FIG. 6 in analog form). Now the video signal of FIG. 4 is read into the image memory 7. Next, the video signal illustrated in FIG. 5 is supplied at the output of the A/D converter 6. The difference stage 8 now forms the difference between the digital values of the curve progressions of FIGS. 4 and 5. After the absolute value formation the difference of the signals yields a digital output corresponding to the analog waveform shown in FIG. 7.

The values of the digital signal corresponding to the waveform of FIG. 6 are supplied to the adder 10 and are read into the image memory 11. After the second subtraction the values corresponding to the waveform of FIG. 7 are connected to the one input of the adder 10, whereas the stored values of FIG. 6 are connected to the other input. The respective values corresponding to the waveforms of FIGS. 6 and 7 are added and are read together into the image memory 11. After termination of the examination the sum of all differences is stored in the image memory 11. This operation can be characterized by the following formula:

$$\sum_{n=1}^{n} A_n - A_{n-1}$$

The memory contents of the image memory 11 are constantly read out and displayed on the monitor 13 via the D/A converter 12. In this manner, one can check (or control) the course of the examination and terminate it immediately if there is satisfactory image quality. After termination of the examination, the sum of all contour progressions of the heart 14 is imaged on the monitor 13. In FIG. 9 a video image of this type is illustrated which clearly shows the movement range of the heart 14. This image is largely noise-free and shows the movement differences without the superimposition of, for example, the ribs 16. Opposing movements are characterized by a constriction 17.

The circuit 9 can be dispensed with if the difference stage 8 is constructed of digital modules, for example, of two integrated arithmetic logic units of the type SN 74 A 181. The connection of the polarity symbol bit is in this case not wired and a positive polarity symbol is input, in a fixedly wired fashion, to the memory 11.

With this X-ray diagnostic installation external heart border movements can be represented without contrast medium. If a contrast medium injection is made, then also wall movements, for example, of the ventricle, can thereby be detected.

It will be apparent that many modifications and variations may be made without departing from the scope of the teachings and concepts of the present invention.

Supplementary Discussion

As is apparent to those skilled in the art, FIG. 8 illustrates diagrammatically a summation of the waveforms of FIGS. 6 and 7, and thus indicates the result of a summation in adder 10 of the digital values represented by the waveforms of FIGS. 6 and 7. FIG. 8 thus represents diagrammatically a video line which might appear on monitor 13 after the storage of the digital values representing the summation of the values from corresponding lines of successive subtraction images, as supplied by components 8 and 9.

By way of example, the video camera 5 may supply fifty or sixty images per second. Each successive image ($A_{n-1}$) may be stored in digital form in image memory 7 and subtracted pixel by pixel from the next succeeding image ($A_n$). The resultant outputs from component 9 can be summed in components 10 and 11 for a desired number of images, the symbol $A_n$ representing the pixels of one image and n representing the number of images whose successive subtraction values are to be summed.

We claim as our invention:

1. An X-ray diagnostic installation comprising a television pickup system, a first image memory, a difference stage for providing subtraction images through difference formation from the stored and the current video signals, and a monitor, wherein an adder is connected with the output of the difference stage, and a second image memory is connected with the output of the adder so that, in the second image memory, the image point data from the difference stage is summed up, and wherein the output signal of the second image memory is supplied to the monitor, characterized in that circuit means comprising said difference stage, and disposed between the first image memory and the adder, is so designed that it forms the absolute values $|A|$ of the image point data from the difference stage.

2. Method for producing subtraction images characterized by the steps of forming the difference between a current and a stored video signal to supply a differential signal, forming the absolute values of the image point information of a plurality of differential signals, summing the absolute values of corresponding image point information of respective differential signals, and displaying an image of the image point information formed by the summed absolute values.

3. Method according to claim 2, wherein successive differential signals are formed representing subtraction images of an organ whose position cyclically varies as a function of time, and summing absolute values of image point information for successive different phases of the movement of the organ to produce a displayed image showing the range of movement of the organ.

* * * * *